(12) United States Patent
Ikonomov et al.

(10) Patent No.: US 9,126,309 B2
(45) Date of Patent: Sep. 8, 2015

(54) PROFILED PLANE ABRADING TOOL FOR TIRE REPAIRS

(75) Inventors: Metodi Lubenov Ikonomov, Moore, SC (US); Cesar Enrique Zarak, Simpsonville, SC (US)

(73) Assignees: Michelin Recherche ET Technique S.A., Granges-Paccot (CH); Compagnie Generale Des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 13/989,761

(22) PCT Filed: Nov. 30, 2010

(86) PCT No.: PCT/US2010/058443
§ 371 (c)(1),
(2), (4) Date: May 24, 2013

(87) PCT Pub. No.: WO2012/074517
PCT Pub. Date: Jun. 7, 2012

(65) Prior Publication Data
US 2013/0240120 A1    Sep. 19, 2013

(51) Int. Cl.
*B29C 73/10*    (2006.01)
*B24D 9/00*    (2006.01)
(Continued)

(52) U.S. Cl.
CPC .. *B24D 9/00* (2013.01); *B26D 1/44* (2013.01); *B26D 3/003* (2013.01); *B29C 73/26* (2013.01);
(Continued)

(58) Field of Classification Search
CPC ............. B29D 30/72; B29D 2030/726; B29D 2030/728; B29C 73/10; B25F 5/003
USPC .................. 156/95, 97, 98, 116; 451/25, 457
See application file for complete search history.

(56) References Cited

U.S. PATENT DOCUMENTS

| 1,395,309 A | 11/1921 | Taber et al. |
| 1,569,490 A | 1/1926 | Hiscock |

(Continued)

FOREIGN PATENT DOCUMENTS

| CN | 1706629 A | 12/2005 |
| CN | 101045285 A | 10/2007 |

(Continued)

OTHER PUBLICATIONS

Michelin Truck Tire Nail Hole Repair Procedures www.michelintruck.com, 2007.*

(Continued)

*Primary Examiner* — Martin Rogers
(74) *Attorney, Agent, or Firm* — Hahn Loeser & Parks, LLP; Bret A. Hrivnak

(57) ABSTRACT

The present invention includes methods and apparatus for controlling the abrasion of a tire surface. Particular embodiments provide an abrading tool for abrading a surface of a tire, the tool comprising means for rotating an abrading wheel, an abrading wheel rotatably attached to the means for rotating, and a depth guide secured to the means for rotating, wherein the depth guide includes a pair of freely rotatable, spaced apart guide wheels. Further embodiments include a depth guide configured for use with an abrading tool which includes a abrading wheel and a means for rotating the abrading wheel, the depth guide comprising a mounting member securable to the means for rotating and a pair of freely rotatable, spaced apart guide wheels rotatably attached to the mounting member. Particular embodiments further include a method for preparing a portion of a tire for repair.

6 Claims, 4 Drawing Sheets

(51) Int. Cl.
  *B26D 1/44* (2006.01)
  *B26D 3/00* (2006.01)
  *B29C 73/26* (2006.01)
  *B60C 25/00* (2006.01)
  *B25F 5/00* (2006.01)
  *B29L 30/00* (2006.01)

(52) U.S. Cl.
  CPC ............ *B60C 25/16* (2013.01); *B25F 5/003* (2013.01); *B29C 73/10* (2013.01); *B29C 2073/264* (2013.01); *B29L 2030/00* (2013.01)

(56) References Cited

U.S. PATENT DOCUMENTS

| | | | |
|---|---|---|---|
| 1,591,813 A | | 7/1926 | Frengle |
| 1,591,816 A | | 7/1926 | Hawkinson |
| 2,000,300 A | * | 5/1935 | Scruby .............. 157/13 |
| 2,523,319 A | | 9/1950 | Middlestadt |
| 2,678,487 A | | 5/1954 | Onsrud |
| 2,937,576 A | | 5/1960 | Olton |
| 2,985,231 A | | 5/1961 | Roesch |
| 3,421,411 A | * | 1/1969 | Lowry et al. .......... 409/143 |
| 3,521,408 A | | 7/1970 | Neugebauer |
| 3,739,662 A | | 6/1973 | Windelman |
| 3,860,050 A | | 1/1975 | Banks et al. |
| 4,168,730 A | | 9/1979 | Keller |
| 4,230,164 A | | 10/1980 | Mericle |
| 4,319,615 A | | 3/1982 | Ditmanson |
| 4,333,686 A | | 6/1982 | Arnswald |
| 4,382,590 A | | 5/1983 | Pandya et al. |
| 4,479,523 A | | 10/1984 | Peterson et al. |
| 4,620,407 A | | 11/1986 | Schmid |
| 4,644,701 A | | 2/1987 | Arrigoni et al. |
| 5,115,870 A | * | 5/1992 | Byrne .................. 172/15 |
| 5,139,840 A | | 8/1992 | Ferrara |
| 5,445,691 A | | 8/1995 | Nakayama et al. |
| 5,468,100 A | | 11/1995 | Naim |
| 5,540,210 A | * | 7/1996 | Jones .................. 125/13.01 |
| 5,697,833 A | | 12/1997 | Hislop |
| 5,788,414 A | | 8/1998 | Gordon |
| 6,129,611 A | * | 10/2000 | Yamaguchi ............ 451/50 |
| 6,461,135 B1 | | 10/2002 | Lagnier et al. |
| 6,623,342 B1 | | 9/2003 | McDonald |
| 7,596,872 B2 | | 10/2009 | Clarke et al. |
| 2002/0066190 A1 | * | 6/2002 | Fey et al. ............ 30/371 |
| 2002/0095810 A1 | | 7/2002 | Carlson et al. |
| 2003/0010802 A1 | * | 1/2003 | Blaimschein et al. ...... 225/96 |
| 2005/0081972 A1 | | 4/2005 | Lopez |
| 2005/0200087 A1 | | 9/2005 | Vasudeva et al. |
| 2005/0236069 A1 | | 10/2005 | O'Brien |
| 2007/0232195 A1 | | 10/2007 | Reppel |
| 2008/0005947 A1 | | 1/2008 | Barna |
| 2009/0170405 A1 | * | 7/2009 | Barusta ............ 451/11 |
| 2010/0143060 A1 | | 6/2010 | Weber et al. |
| 2011/0277898 A1 | | 11/2011 | Barraud et al. |

FOREIGN PATENT DOCUMENTS

| | | |
|---|---|---|
| CN | 101148020 A | 3/2008 |
| DE | 3926946 A1 | 1/1991 |
| DE | 4442553 A1 | 11/1994 |
| FR | 1211507 A | 3/1960 |
| RU | 10634 U1 | 8/1999 |
| RU | 2176954 C1 | 12/2001 |
| SU | 44448 A1 | 11/1942 |
| SU | 380436 | 11/1972 |
| SU | 1659223 A1 | 6/1991 |
| WO | 2012057806 A1 | 5/2012 |

OTHER PUBLICATIONS

Tire Repair for Passenger Car and Light Truck Tires Continental Tire North America, 2005.*
2007-2008 Pneumatic Tools Catalog Gison Machinery, 2007.*
PCT/US2010/058443 International Search Report and Written Opinion dated Feb. 8, 2011, 12 pages.
Michelin Truck Nail Hole Repair Procedures, Michelin 2007, 6 pages, retrieved from internet <URL:www.michelintruck.com/assets/pdf/NailHoleRepairManual.pdf>.
Tire Repair for Passenger Car and Light Truck Tires, Continental Tire Product Service Information Bulletin PSIB May 2001, Nov. 17, 2005, 2 pages, Continental Tire North America PLT Replacement Business Unit Customer Service.
A Shipwright in Training: Hundredths of an inch in wood and metal, retrieved on Dec. 12, 2014 from http://daviddanielsdesign.com/boatblog/index.php/page6/, 46 pages.
Tom's Workbench: Changing dovetail width with a fixed jig, retrieved on Dec. 22, 2014 from http://tomsworkbench.com/2010/04/05/changing-dovetail-width-with-a-fixed-jig/, 5 pages.
Sculpted Rocking Chair: Shaping the Seat, retrieved on Dec. 12, 2014 from http://thecraftsmanspath.com/2009/03/30/sculpted-rocking-chair-shaping-the-seat/, 11 pages.
Harper, Sam, Me making a violin, retrieved on Dec. 12, 2014 from http://poorfolkbows.com/violin4.htm, 18 pages.

* cited by examiner

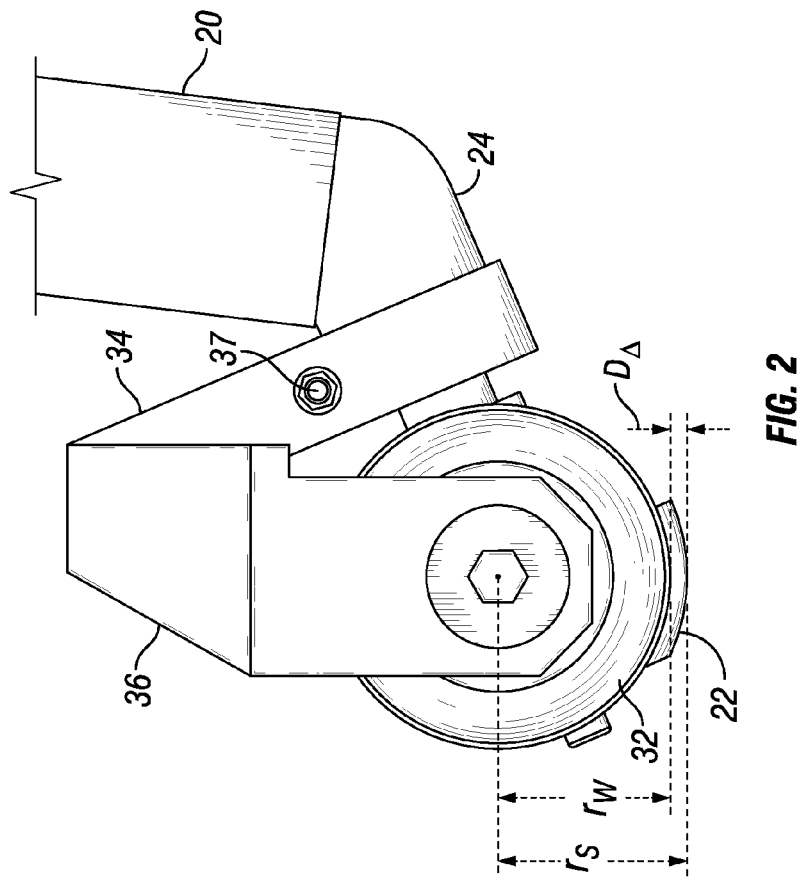
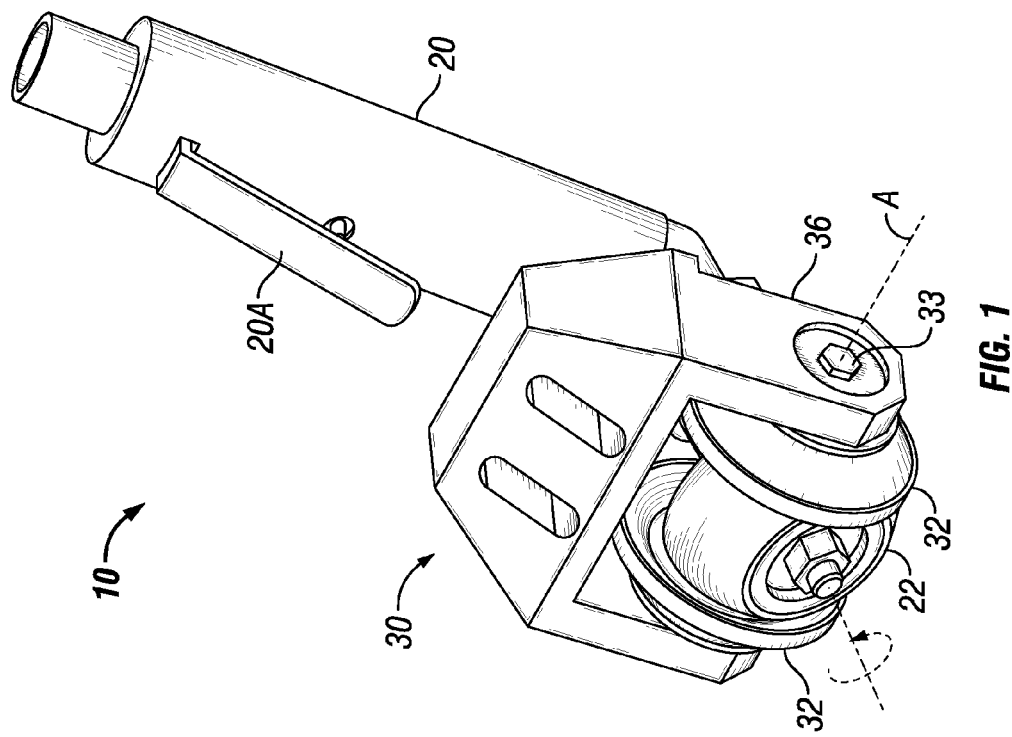
FIG. 1
FIG. 2

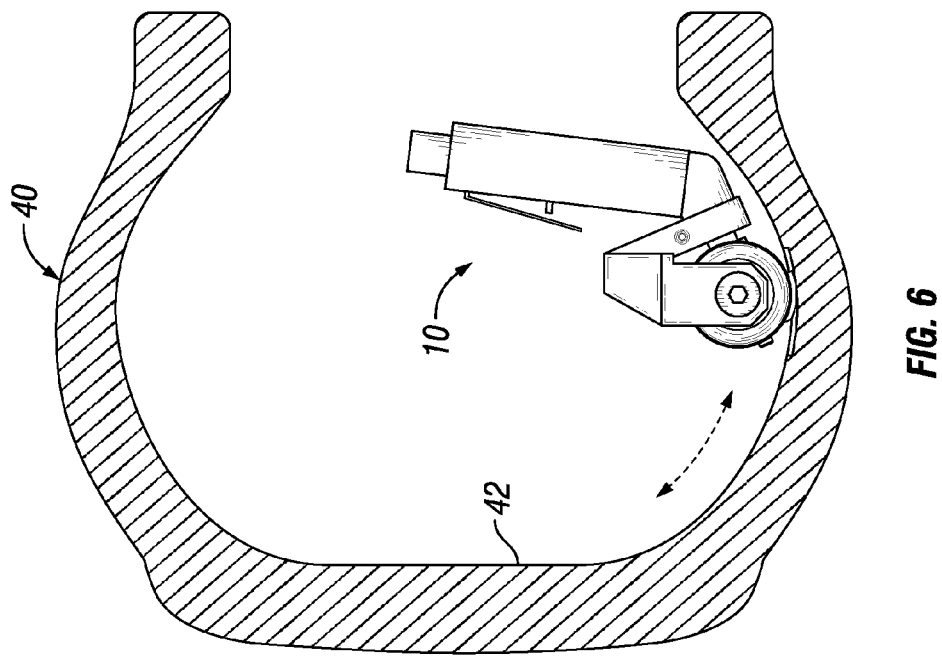
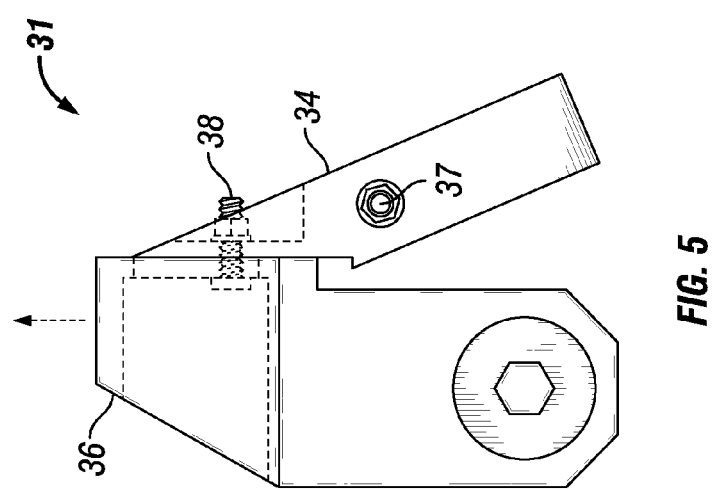

PROFILED PLANE ABRADING TOOL FOR TIRE REPAIRS

This application is a National Stage application of International Application No. PCT/US2010/058443, filed Nov. 30, 2010, to which this application claims priority and the benefit of, the disclosure of which is also hereby incorporated by reference.

FIELD OF THE INVENTION

This invention relates generally to tire repair, and, more specifically, to a method and apparatus for preparing the damaged portion of a tire to be patched.

BACKGROUND OF THE INVENTION

Tires are known to be susceptible to becoming damaged. Such damage may occur when a tire encounters road debris, such as nails, glass, and stone, and during tire mounting and dismounting. Damage may also form a defect in the tire. Damage may occur on the inside or outside of the tire, or may penetrate the tire, such as a puncture or laceration. Further, the damage may occur along the tread area, the sidewalls, or the shoulders, which is the area between the tread area and a sidewall. A damaged tire portion generally refers to a portion of the tire needing repair, where the need may arise for any reason.

When repairing the damaged area of a tire, a patch is commonly used to cover and seal the damaged area. A patch is generally made of polymeric or elastomeric material, such as natural or synthetic rubber. A patch may further include reinforcements extending within the patch, which may be formed of metallic cables or cords formed of any textile material for the purpose of partially replacing the function of any damaged tire reinforcement. Further, the patch may be adhesively affixed or cured to the tire. The damaged area may be prepared before application of the patch. For example, debris and any damaged material may be removed, the damaged portion cleaned, and/or an adhesive or cement applied to the damaged area.

SUMMARY OF THE INVENTION

Particular embodiments of the present invention include methods and apparatus for preparing a portion of a tire for repair. Particular embodiments of the present invention include an abrading tool for grinding a surface of a tire. The tool may comprise a means for rotating an abrading wheel, an abrading wheel rotatably attached to the means for rotating, and a depth guide secured to the means for rotating. The depth guide may include a pair of freely rotatable, spaced apart guide wheels.

Particular embodiments of the present invention additionally include a depth guide configured for use with an abrading tool which includes an abrading wheel and a means for rotating the abrading wheel. The depth guide may comprise a mounting member securable to the means for rotating and a pair of freely rotatable, spaced apart guide wheels rotatably attached to the mounting member.

Particular embodiments of the present invention also include a method for preparing a portion of a tire for repair. The method may include the step of providing an abrading tool for grinding a surface of the tire, wherein the tool includes means for rotating an abrading wheel, an abrading wheel rotatably attached to the means for rotating, and a depth guide. The depth guide may include a mounting member secured to the means for rotating and a pair of freely rotatable, spaced apart guide wheels rotatably attached to the mounting member. The method may additionally include the steps of engaging the tool with a surface of the tire and removing with the tool, to a desired depth, a quantity of tire material from the surface of the tire.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 1 is a perspective view of one embodiment of an abrading tool for abrading a surface of a tire.

FIG. 2 is a side elevational view of the abrading tool shown in FIG. 1.

FIG. 5 is a partial cross-sectional view of a mounting member showing the sliding adjustment between the guide wheel bracket and the mounting bracket for the purpose of controlling the abrading depth of an abrading tool.

FIG. 6 is a side view of the abrading tool shown in FIG. 1 engaged with a surface of a tire during an abrading operation.

DETAILED DESCRIPTION OF THE DRAWINGS

Figure 3:
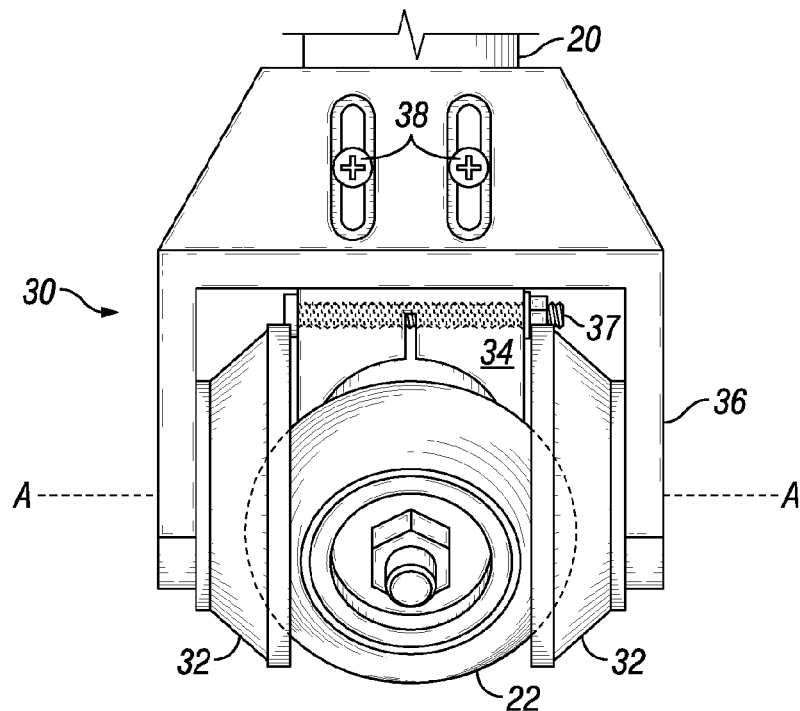
FIG. 3 is a front elevational view of the abrading tool shown in FIG. 1.

Particular embodiments of the present invention provide methods and apparatus for preparing a portion of a tire for repair, which may have been damaged or otherwise needs repair. Specifically, the damaged portion of the tire is prepared to facilitate repair by patching and/or filling the damaged portion using a tire patch and/or tire patching material. It is known that it may be desirable to repair or reinforce a particular area of a tire, such as, for example, when the tire is damaged during tire operation. This damaged area may be located anywhere on a tire, such as in a sidewall, the shoulder, or the tread areas. Typically, the area to be patched is prepared before receiving the patch to promote adhesion of the patch. For example, the tire surface may be cleaned with a solution and/or by a buffing or abrading operation. For particular patches, it may be desirous to recess the patch a desired depth into the tire surface by removing material from the surface sufficient to form a patch receiving area having a desired depth. The depth of the patch receiving area may extend a constant or variable depth from the original tire surface.

Particular embodiments of such methods may include the step of providing an abrading tool for abrading or grinding a surface of a tire, wherein the tool includes means for rotating an abrading wheel, an abrading wheel rotatably attached to the means for rotating, and a depth guide. The depth guide may include a mounting member secured to the means for rotating and a pair of rotatable, spaced apart guide wheels rotatably attached to the mounting member. In particular embodiments, the guide wheels may be freely rotatable and/ or selectively positionable relative to the abrading wheel, which permits a user to adjust the relationship between the guide wheels and the abrading wheel so that the abrading wheel extends a desired distance beyond the diameter of the guide wheels, the desired distance corresponding to a desired abrading or grinding depth. Accordingly, such methods may further include the step of adjusting the abrading depth of the abrading tool by altering the position of the guide wheels relative to the abrading wheel along the mounting member. For purposes of this disclosure, the distance corresponding to a desired grinding depth means that the distance is substantially equal to the maximum depth of tire material to be ground from the surface of a tire and takes into consideration the dimensions of both the guide wheels and the abrading wheel. In instances where the abrading wheel may have worn down from repeated use, for example, the position of the guide wheels may need to be adjusted relative to the abrading wheel in order to achieve the same desired grinding depth as when the abrading wheel was in a less worn down condition.

In particular embodiments, the mounting member may include (1) a mounting bracket secured to the means for rotating and (2) a guide wheel bracket secured to the mounting bracket. In such a configuration, the guide wheels may be rotatably attached to the guide wheel bracket. Additionally, the guide wheel bracket may be selectively positionable relative to the abrading wheel. Alternatively or additionally, the guide wheel bracket may be selectively positionable relative to the mounting bracket. As the guide wheels may be rotatably attached to the guide wheel bracket, the desired grinding depth may be adjusted in a similar manner as described above with regard to adjusting the position of the guide wheels relative to the abrading wheel.

In particular embodiments, the method may also include the steps of engaging the tool with a surface of the tire and removing, with the tool, a quantity of tire material from the surface of the tire to a desired depth. Following the removing step, the method may additionally include the step of applying one or more tire patch materials to the portion of the tire associated with the removed tire material.

The methods generally described above, and the manner in which they are employed or practiced, are now discussed in further detail below with reference to various exemplary embodiments.

With general reference to the embodiments shown in FIGS. 1-6, an abrading tool 10 may be provided to aid in preparing an interior tire surface for repair. As shown in a particular embodiment in FIGS. 1-5, the abrading tool 10 may comprise a means for rotating a abrading wheel, which in one exemplary instance is a rotary drive 20. The rotary drive 20 may be driven pneumatically, hydraulically, or powered by other methods known to those of ordinary skill in the art. In certain instances, the rotary drive 20 may include an angled neck 24 and consequently, the abrading tool 10 may be referred to as an angle grinder. In one embodiment, the angled neck 24 may be angled such that the rotational axis of the rotary drive 20 is oriented at approximately 45° relative to the surface to be ground, although any other angle suitable for abrading the surface of a tire may also be used. In operation, the rotary drive 20 may be engaged by depressing an actuator 20A, although other methods of initiating the drive 20 are also contemplated. In an exemplary embodiment, a abrading wheel 22 may be rotatably attached to the rotary drive 20.

As it may be desirous to control the removal of tire material and to remove only a predetermined depth from a tire surface, the abrading tool 10 may further comprise a depth guide 30 secured to the rotary drive 20. The depth guide 30 may include a pair of freely rotatable, spaced apart guide wheels 32 and a mounting member 31. The mounting member 31 may include a mounting bracket 34, and a guide wheel bracket 36. In particular embodiments, the guide wheel bracket 36 may be substantially U-shaped, that is, the guide wheel bracket may have a pair of spaced apart legs, which each leg affixed at one end to a cross member substantially perpendicular to the legs. In alternate embodiments, the guide wheel bracket 36 may be substantially V-shaped or may take on any other shape suitable for receiving the guide wheels 32 in a desired arrangement. In one embodiment, the guide wheels 32 may be rotatably attached to the guide wheel bracket 36. Any mechanism for rotatably attaching any guide wheel 32 to guide wheel bracket 36 known to one of ordinary skill may be employed. For example, with reference to FIGS. 1-2, such a mechanism 33 comprises a shoulder bolt or any other fastener, bolt, or rod (with an opposing nut or pin or the like) to retain any guide wheel 32 to the guide wheel bracket 36 and more generally to mounting member 31, where such mechanism is also an axle 33 defining a rotational axis A. For purposes of this disclosure, freely rotatable is used to indicate that a guide wheel 32 is not substantially constrained from rotational motion about its rotational axis and that a guide wheel is not driven or powered by a means for rotating or driving. Accordingly, an operator may place the guide wheels 32 in contact with a tire surface and roll the abrading tool 10 along a desired grinding path with the guide wheels 32 rotating about their rotational axes. In the embodiment shown in FIGS. 1-3, the rotational axes A of the guide wheels 32 are co-axial (i.e., share the same rotational axis, even though each operates on an independent axle 33). More generally, the rotational axes of the guide wheels 32 may be parallel. In other embodiments, guide wheels may share a common axle. With reference to FIGS. 1-3, the rotational axis A of the abrading wheel 22 is substantially perpendicular to the rotational axes of the guide wheels 32, yet it is understood that other angular relationships between the rotational axes of the abrading wheel and any guide wheel may be employed.

To minimize slipping of the guide wheels 32 on the surface of a tire during abrading operations, at least a portion of the circumference 32A of any guide wheel 32 may include a generally non-slip or slip resistant surface. Any known method or mechanism known to one of ordinary skill may be employed to provide the non-slip or texturized surface. For example, the non-slip surface may include a texture formed in the circumference 32A, e.g. knurling or sand blasting, or a texture or coating applied to the circumference, e.g. sand paper, a particulate-based coating, or a layer of material having a high coefficient of friction, such as rubber or any other elastomer or the like.

In an exemplary embodiment, the depth guide 30 may be secured to the rotary drive 20 by ring clamp 35. As it may be desirable to substitute one depth guide 30 for another, to adjust the placement of the depth guide 30 on the rotary drive 20, or to remove the depth guide 30 from the rotary drive 20 entirely, a ring clamp adjustment member 37 may be provided, whereby the grip of the ring clamp 35 on the rotary drive 20 may be selectively loosened and tightened depending upon the desired placement of the depth guide 30. In other embodiments, depth guide 30 may comprise any other design or structure capable of being secured to rotary drive 20.

In particular embodiments, the guide wheels 32 are selectively positionable relative to the abrading wheel 22. Further, as exemplarily shown in FIG. 2, abrading wheel 22 may extend a distance beyond the diameter of the guide wheels 32, where the distance corresponds to a desired grinding depth $D_A$. With reference to FIGS. 1-5, the desired grinding depth $D_A$ may be adjusted by altering the position of the guide wheel bracket 36 relative to the mounting bracket 34, where guide wheels 32 are attached to the guide wheel bracket 36. Guide wheel bracket 36 may be adjustably mounted to mounting bracket 34 in any known manner to allow guide wheel bracket 36 to be selectively positioned relative to mounting bracket 34. For example, with reference to FIGS. 3-5, the guide wheel bracket 36 may be selectively mounted to the mounting bracket 34 by a one or more fasteners 38, where brackets 34, 36 are also in a slideable arrangement (i.e., each bracket is capable of sliding along the other to adjust the relative position of each bracket). It is understood that other arrangements, designs, and means may be employed by one of ordinary skill in the art for adjustably mounting guide wheels along depth guide 30. For example, guide wheel bracket 36 may be selectively attached to the mounting bracket 34 by way of a threaded rod, whereby an operator may adjust the position of guide wheel bracket 36 relative to mounting bracket 34 to adjust the grinding depth $D_A$ by rotating the threaded rod, such as by way of a wheel in communication with the threaded rod. In such an arrangement, relative translation of the guide wheel bracket 36 may extend in a direction of the rotational axis of the threaded rod. Alternatively or additionally, the guide wheels 32 may be selectively adjustable, independently or collectively, along the depth guide 30 relative to both the guide wheel bracket 37, the mounting member 34, and the abrading wheel 22. For example, a slot may be arranged along a portion of the guide wheel bracket 36 along which a corresponding guide wheel 32 may be selectively positioned. In such embodiments, it is understood that mounting member 34 and guide wheel bracket 36 may be unitary or positionally fixed relative to each other, while the guide wheels 32 may be selectively adjustable along the depth guide 30.

In particular embodiments, the depth guide 30 may include a scale to assist an operator in selectively positioning guide wheels 32 to achieve a desired abraded depth $D_A$. The scale may measure distance or depth, or any other desired measurement to assist the operator. In one example, the scale may be in millimeters, although other depth measurement scales (e.g. fractional inches) may also be employed. Alternatively or additionally, the depth guide 30 may include a vernier scale for measuring the desired grinding depth $D_A$.

Figure 4:
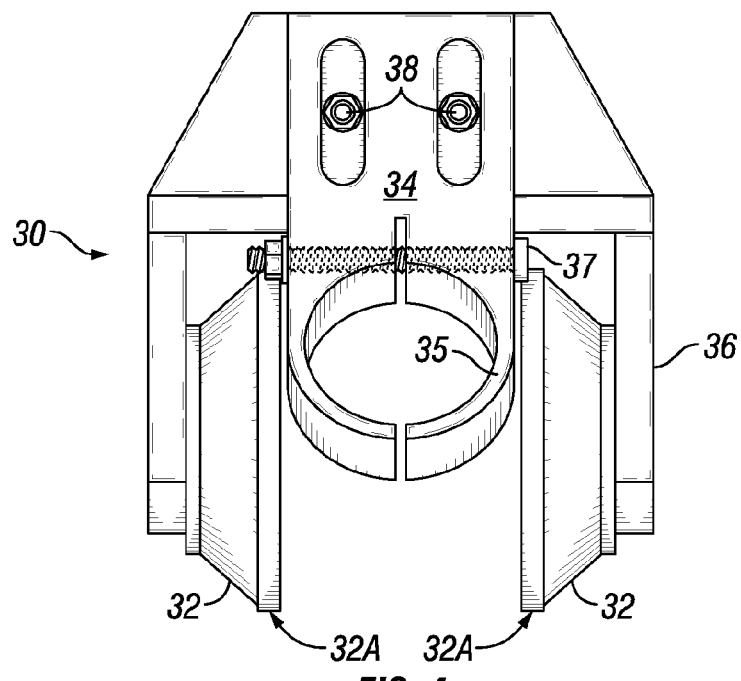
FIG. 4 is a rear elevational view of the depth guide of the abrading tool shown in FIG. 1, with the abrading wheel removed for clarity.

In the embodiment shown in FIGS. 1, 3, and 4, the guide wheels 32 are frustoconical in shape and have a hollow interior region or concavity. Accordingly, the guide wheels 32 may be referred to as hollow frustocones. Such a configuration may be desirable so as to accommodate the dimensions of the abrading wheel 22, as shown specifically in FIG. 3 where the circumference of the abrading wheel can be seen to extend into the hollow or concavity of each guide wheel 32. Alternatively, other configurations of guide wheels 32 are also envisioned, and may include any known wheel design, including, for example, non-hollow frustocones and disk-shaped wheels, which may or may not have any hollow recess similar to the embodiment discussed above. In the instance of disk-shaped guide wheels 32, the depth guide 30 may be dimensioned such that the guide wheels 32 are sufficiently spaced apart, whereby the space between the guide wheels is greater than the diameter of the abrading wheel 22.

With reference to the embodiment of FIGS. 1-3, abrading wheel 22 is a wheel having an outer surface forming a portion of a sphere. In other words, the outer surface of the wheel generally extends a constant radius $r_s$ from a spherical center point. In the embodiment shown, the outer surface of the wheel forms a spherical segment, which is created by cutting a sphere with a pair of parallel planes. In certain embodiments, the spherical radius $r_s$ of the abrading wheel surface may be substantially equal to the rolling radius $r_w$ of the guide wheels 32. Alternatively or additionally, the radius $r_s$ of the abrading wheel 22 may be substantially equal to the radius $r_w$ of the guide wheels 32 plus the desired grinding depth $D_A$. In other embodiments, abrading wheel 22 may comprise any other shaped wheel, such as a cylindrical abrading wheel or conical wheel, for example.

Figure 7:
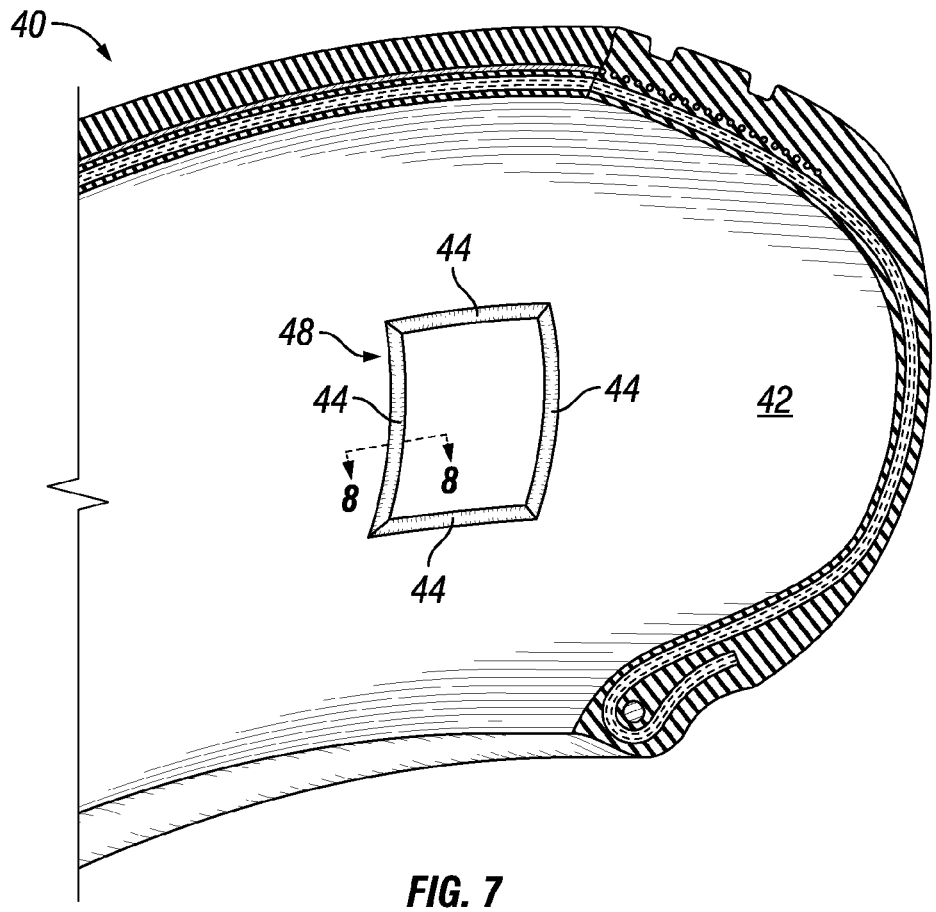
FIG. 7 is a perspective sectional view of a tire having a tire patch application area prepared along a tire surface by an abrading operation using an exemplary abrading tool.

Abrading tools as discussed herein are used to form discontinuities along a tire surface to prepare the surface for repair. With reference to FIG. 6, abrading tool 10 engages interior tire surface 42 at a desired location to generate any desired discontinuities. The example shown in FIG. 7 provides an arrangement of discontinuities 44 forming grooves to prepare the tire for receiving a tire patch. In the example, the grooves form an outline or perimeter about a repair or tire patch application area 48. As would be understood by one of ordinary skill in the art, it may be desirous for the dimensions of the area 48 to be slightly greater than the width of the selected tire patch to provide adequate room for adjustment of the patch and to ensure appropriate fit between the tire and the patch.

Figure 8:
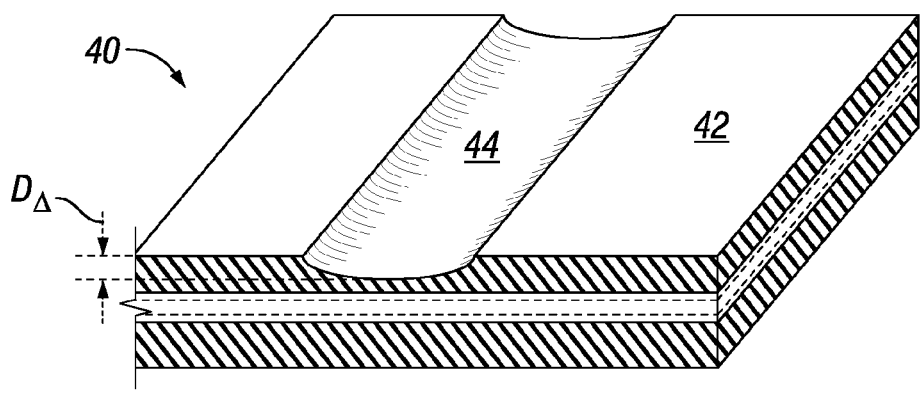
FIG. 8 is a cross-sectional perspective view along line 8-8 of a discontinuity formed in the surface of a tire by an abrading operation.

With reference to FIG. 8, the abraded shape of the discontinuities 44 of FIG. 7, having been formed using the tool of FIGS. 1-3, is shown. Discontinuities 44 are shown to have a concave profile corresponding to the shape of the partially spherical abrading wheel 22, although other shaped discontinuities may be formed employing differently shaped abrading wheels known to those of ordinary skill in the art.

In one exemplary embodiment, the abrading tool 10 may be used to remove substantially all of the tire material in the tire patch application area 48 to the desired depth $D_A$. Alternatively or additionally, the material may be peeled away manually with a force sufficient to overcome the bond between the material to be removed and the portion of the tire to remain intact. Following removal of the material in the tire patch application area, one or more tire patch or repair materials may be placed in the tire patch application area 48.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method for preparing a portion of a tire for repair, the method comprising the steps of:
   providing an abrading tool for grinding a surface of a tire, wherein the tool includes:
      a rotary drive for rotating an abrading wheel;
      the abrading wheel rotatably attached to the rotary drive; and
      a depth guide including a mounting member secured to the rotary drive and a pair of rotatable guide wheels rotatably attached to the mounting member, the pair of guide wheels being spaced apart along a common rotational axis such that the abrading wheel is arranged between the pair of guide wheels, and where the abrading wheel has a rotational axis arranged substantially perpendicular to the common rotational axis of the guide wheels;
   engaging the tool with a surface of the tire; and
   removing with the tool, to a desired depth, a quantity of tire material from the surface of the tire to thereby form a discontinuity along the surface of the tire, wherein a circumference of the abrading wheel extends into a hollow of each guide wheel and the circumference contacts the surface of the tire during the removing with the tool.

2. The method of preparing a tire of claim 1, further comprising the step of:
applying one or more tire patch materials to the portion of the tire associated with the removed tire material.

3. The method of preparing a tire of claim 2, wherein the guide wheels are selectively positionable relative to the abrading wheel and the method further includes the step of adjusting a desired abrading depth of the abrading tool by altering the position of the guide wheels relative to the abrading wheel along the mounting member.

4. The method of preparing a tire of claim 3, wherein the mounting member includes a mounting bracket secured to the rotary drive and a guide wheel bracket secured to the mounting bracket, where the pair of guide wheels are rotatably attached to the guide wheel bracket and the guide wheel bracket is selectively positionable relative to the mounting bracket to achieve the desired abrading depth of the abrading tool, the desired abrading depth comprising a distance between a bottom of the abrading wheel and a bottom of the guide wheels.

5. The method of claim 1, wherein the circumference of each guide wheel includes a non-slip surface.

6. The method of claim 1, wherein the guide wheels are frustocones.

* * * * *